United States Patent
Schmidl et al.

(10) Patent No.: US 6,546,055 B1
(45) Date of Patent: Apr. 8, 2003

(54) CARRIER OFFSET DETERMINATION FOR RF SIGNALS HAVING A CYCLIC PREFIX

(75) Inventors: Timothy M. Schmidl, Dallas, TX (US); Donald C. Cox, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 09/229,453

(22) Filed: Jan. 12, 1999

Related U.S. Application Data

(60) Provisional application No. 60/071,122, filed on Jan. 12, 1998.

(51) Int. Cl.$^7$ ................................................. H04B 1/10
(52) U.S. Cl. ........................ 375/244; 375/220; 375/224; 375/286; 375/320; 375/326; 375/330; 375/353; 375/363
(58) Field of Search ................................. 375/219, 220, 375/224, 242, 244, 286, 316, 320, 326, 329, 330, 353, 354, 363

(56) References Cited

U.S. PATENT DOCUMENTS

| | | | |
|---|---|---|---|
| 5,345,440 A | | 9/1994 | Gledhill et al. ................ 370/19 |
| 5,444,697 A | | 8/1995 | Leung et al. .................. 370/19 |
| 5,682,376 A | * | 10/1997 | Hayashino et al. ......... 370/206 |
| 5,732,113 A | * | 3/1998 | Schmidl et al. ............. 375/354 |

OTHER PUBLICATIONS

Magnus Sandell et al.; "Timing and frequency synchronization in OFDM systems using the cyclic prefix;" Proceedings IEEE International Symposium on Synchronization, pp. 16–19, Dec. 1995.

David C. Rife et al.; "Single–tone parameter estimation from discrete–time observations;" IEEE Transactions on Information Therry, VEL. IT–20, No. 5, Sep. 1974.

John A. C. Bingham; "Multicarrier modulation for data transmission: an idea whose time has come;" May 1999, IEEE Communications Magazine.

Bernard Le Floch et al.; "Digital sound broadcasting to mobile receivers;" IEEE Transactions on Consumer Electronics, vol. 35, Aug. 1989.

Paul H. Moose et al; "A technique for orthogonal frequency division multiplexing frequency offset correction;" IEEE Transactions on Communications, vol. 42, No. 10, Oct. 1994.

(List continued on next page.)

*Primary Examiner*—Chi Pham
*Assistant Examiner*—Pankaj Kumar
(74) *Attorney, Agent, or Firm*—Lumen Intellectual Property Services, Inc.

(57) ABSTRACT

A method of determining an integral portion of a carrier offset $\Delta f_c$ of an RF signal transmitted from a transmitter at a transmit carrier frequency $f_{ct}$ and an apparatus for carrying out the method. The signal consists of at least two data symbols $S_1$ and $S_2$, each having a useful part preceded by a cyclic prefix containing a tail portion of the useful part, such that in the time domain the useful part occupies a symbol interval $T_s$ and the cyclic prefix occupies a guard interval $T_g$. The carrier offset $\Delta f_c$ between a receive carrier frequency $f_{cr}$ and the transmit carrier frequency $f_{ct}$ is calculated in the form of an integral multiple of the inverse $1/T_s$ of the symbol interval. The method is especially useful in application to data symbols which are multiplexed by the orthogonal frequency division multiplexing (OFDM) and are constructed from sub-symbols $c_k$ belonging to a $2^m$-ary constellation of complex values equally spaced in phase, such as phase-shift keyed (PSK) constellations, e.g., BPSK, QPSK, DQPSK, 8-PSK, 8-DPSK, 16-PSK and 16-DPSK or amplitude and phase-shift keyed (APSK) constellations, e.g., 16-APSK, 16-DAPSK, 64-APSK and 64-DAPSK.

17 Claims, 7 Drawing Sheets

OTHER PUBLICATIONS

Ferdinand ClaBen et al.; "Synchronization algorithms for an OFDM system for mobile communication;" ITG–FACHTAGUNG 130, Munich, Oct. 26–28, 1994, pp. 105–113.

Flavio Daffara et al. "A new frequency detector for orthogonal multicarrier transmission techniques;" IEEE 45$^{th}$ Vehicular Technology Conference, 2:804–809, Jul. 25–28, 1995.

Timothy M. Schmidl et al.; "Low–overhead, low–complexity [burst] synchronization for OFDM;" IDDD International Conference on Communications (ICC), 3:1301–1306, Jun. 23–27, 1996.

T.M. Schmidl et al.; "Blind synchronization for OFDM;" Electronics Letters, 16$^{th}$ Jan. 1997, vol. 33, No. 2.

* cited by examiner

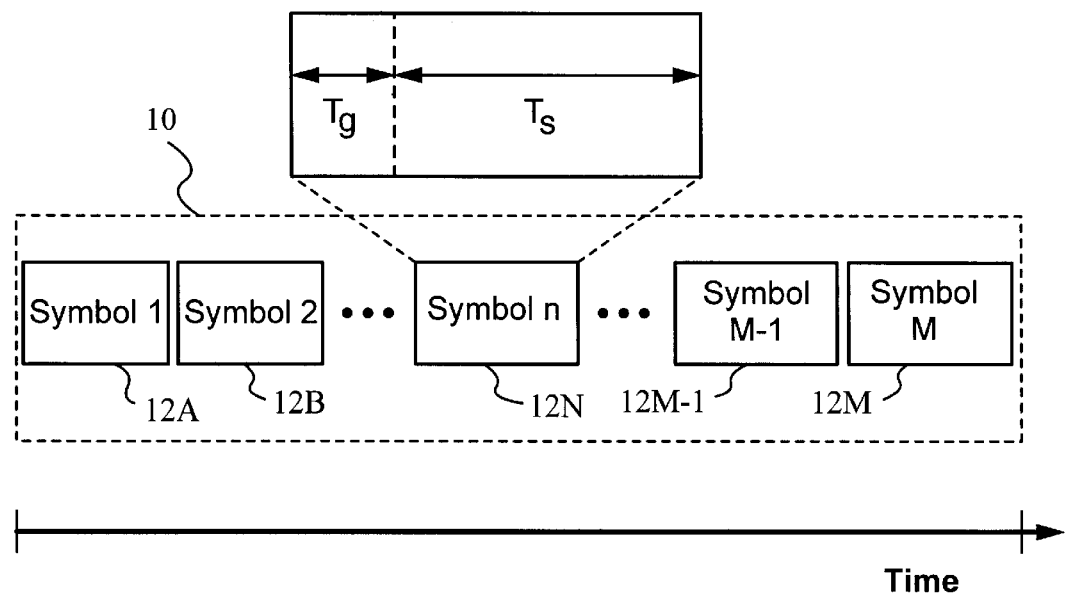
FIG. 1 *(Prior Art)*
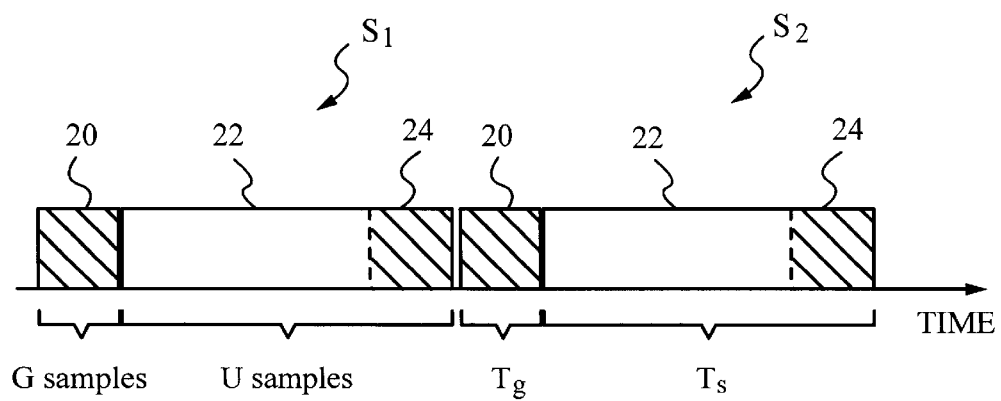
FIG. 2

CARRIER OFFSET DETERMINATION FOR RF SIGNALS HAVING A CYCLIC PREFIX

PRIORITY DATA

This application claims priority from U.S. provisional patent application Ser. No. 60/071,122 filed Jan. 12, 1998.

FIELD OF THE INVENTION

This invention relates generally to a method and apparatus for determining a carrier frequency offset encountered in wireless systems and using this information for synchronization purposes, and in particular to determining a large carrier frequency offset using symbols having a cyclic prefix.

BACKGROUND OF THE INVENTION

Wireless communications systems using radio-frequency (RF) signals for transmitting data are rapidly gaining popularity. These include both continuous data transmission systems, such as digital broadcast TV, as well as systems transmitting data at random times in bursts, e.g., wireless local area networks (WLANs)

In a typical RF data transmission system baseband data is transmitted by a transmitter which processes the baseband data and modulates it on a transmit carrier frequency $f_{ct}$ to generate an RF signal. The RF signal is usually composed of groups of symbols called data frames. FIG. 1 illustrates a data frame 10 in the time domain. Frame 10 is composed of a number of consecutive data symbols 12A through 12M. Symbol 12N is shown in more detail to reveal its useful portion spanning a symbol interval $T_s$ and its guard portion containing, e.g., a cyclic prefix, and spanning a guard interval $T_g$. Guard interval $T_g$ precedes symbol interval $T_s$. Therefore, each symbol 12 has a total duration of $T_g+T_s$ seconds.

A receiver receives data frame 10, demodulates symbols 12 and processes them to retrieve the transmitted baseband data. In order to properly perform this function the receiver has to achieve proper symbol timing and frequency synchronization with the transmitter. There are several aspects of synchronization that require careful attention for proper reception of data frame 10.

First, the receiver must determine the exact timing of the beginning of each symbol 12 within frame 10. If correct timing is not known, the receiver will not be able to reliably remove the cyclic prefixes and correctly isolate individual symbols 12 before performing further processing.

Second, the receiver has to also perform a generally more difficult task of determining and correcting for carrier frequency offset $\Delta f_c$. Ideally, the receive carrier frequency $f_{cr}$ should exactly match the transmit carrier frequency $f_{ct}$. If this condition is not met the mis-match contributes to a non-zero carrier offset $\Delta f_c$. Depending on the type of symbols transmitted, inability to correct for carrier offset may prevent the receiver from recognizing symbols 12. Orthogonal frequency division multiplexing (OFDM), although a robust technique for efficiently, transmitting data over a channel, is very susceptible to a non-zero carrier offset $\Delta f_c$. The technique uses a plurality of sub-carrier frequencies within a channel bandwidth to transmit the data. These sub-carriers are arranged for optimal bandwidth efficiency compared to more conventional transmission approaches, such as frequency division multiplexing (FDM), which waste large portions of the channel bandwidth in order to separate and isolate the sub-carrier frequency spectra and thereby avoid inter-carrier interference (ICI). In case symbols 12 are generated by OFDM, the consequence of a carrier offset will be a loss of orthogonality between the OFDM sub-carriers and inter-carrier interference (ICI). This, in turn, will result in a high bit error rate (BER) in the recovered baseband data.

The third synchronization issue is of concern in OFDM communications. Specifically, the transmitter's sample rate has to be synchronized to the receiver's sample rate to eliminate sampling rate offset. Any mis-match between these two sampling rates results in an increased BER.

The transmission of data through a channel via an OFDM signal provides several advantages over more conventional transmission techniques. These advantages include:

a) Tolerance to multipath delay spread. This tolerance is due to the relatively long symbol interval $T_s$ compared to the typical time duration of the channel impulse response. These long symbol intervals prevent inter-symbol interference (ISI).

b) Tolerance to frequency selective fading. By including redundancy in the OFDM signal, data encoded onto fading sub-carriers can be reconstructed from the data recovered from the other sub-carriers.

c) Efficient spectrum usage. Since OFDM sub-carriers are placed in very close proximity to one another without the need to leave unused frequency space between them, OFDM can efficiently fill a channel.

d) Simplified sub-channel equalization. OFDM shifts channel equalization from the time domain (as in single carrier transmission systems) to the frequency domain where a bank of simple one-tap equalizers can individually adjust for the phase and amplitude distortion of each sub-channel.

e) Good interference properties. It is possible to modify the OFDM spectrum to account for the distribution of power of an interfering signal. Also, it is possible to reduce out-of-band interference by avoiding the use of OFDM sub-carriers near the channel bandwidth edges.

Although OFDM exhibits these advantages, prior art implementations of OFDM also exhibit several difficulties and practical limitations. The most important difficulty with implementing OFDM transmission systems involves timing and frequency synchronization between the transmitter and the receiver, as discussed above.

Prior art solutions to obtaining proper timing and synchronization in RF transmission systems depend, among other factors, on the transmission technique, i.e., type of symbol keying. In simple systems appropriate phase lock loops (PLLs), or zero-crossing circuits can be used in the receiver for determining the transmit carrier frequency $f_{ct}$. In addition, or independently of these solutions, data frame 10 may include training symbols which are recognized by the receiver and used to achieve timing and synchronization.

Specifically, in the case of OFDM signals, several solutions have been proposed. In U.S. Pat. No. 5,444,697, Leung et al. suggest a technique for achieving timing synchronization of a receiver to an OFDM signal on a frame-by-frame basis. The method, however, requires that a plurality of the OFDM sub-carriers be reserved exclusively for data synchronization, thus reducing the number of sub-carriers used for encoding and transmitting data. Furthermore, Leung does not suggest a technique for correcting the carrier frequency offset or sampling rate offset. Finally, Leung's technique requires a loop-back to determine the phase and amplitude of each sub-channel, thereby rendering the technique unsuitable for broadcast applications such as digital TV.

In U.S. Pat. No. 5,345,440, Gledhill et al. present a method for improved demodulation of OFDM signals in which the sub-carriers are modulated with values from a quadrature phase shift keying (QPSK) constellation. However, the disclosure does not teach a reliable way to estimate the symbol timing. Instead, assuming approximate timing is already known, it suggests taking a fast Fourier transform (FFT) of the OFDM signal samples and measuring the spread of the resulting data points to suggest the degree of timing synchronization. This technique, however, requires a very long time to synchronize to the OFDM signal since there is an FFT element in the timing synchronization loop. Also, their method for correcting for carrier frequency offset assumes that timing synchronization is already known. Furthermore, the achievable carrier offset acquisition range is limited to half a sub-channel bandwidth. This very limited range for carrier offset correction is insufficient for applications such as digital television where carrier frequency offsets are :likely to be as much as several tens of sub-carrier bandwidths. Finally, the disclosure does not teach a method for correcting for sampling rate offset.

In U.S. Pat. No. 5,313,169, Fouche et al. suggest a method for estimating and correcting for the carrier frequency offset and sampling rate offset of a receiver receiving an OFDM signal.

The method requires the inclusion of two additional pilot frequencies within the channel bandwidth. The success of this method is limited because these pilot carriers are susceptible to multipath fading. Furthermore, Fouche et al. do not suggest a reliable method for determining symbol timing. They discuss subtracting the cyclic prefix from each symbol and then trying to find where there is a cancellation, but such a cancellation will not occur in the presence of carrier frequency offset. Also, because their synchronization loop includes a computationally complex FFT, synchronization takes a long time. Additionally, because the method does not correct for carrier frequency offset before taking the FFTs, the method will suffer from inter-carrier interference between the sub-carriers, thus limiting its performance. Finally, the method also has a limited acquisition range for the carrier frequency offset estimation.

In "A Technique for Orthogonal Frequency Division Multiplexing Frequency Offset Correction," *IEEE Transactions on Communications*, Vol. 42, No. 10, Oct. 1994, pp. 2908–14, and in "Synchronization Algorithms for an OFDM System for Mobile Communications." *ITG-Fachtagung* 130, Munich, October 26–28, 1994, pp. 105–113, Moose and Classen, respectively discuss two techniques for OFDM synchronization. Both methods involve the repetition of at least one symbol within an OFDM data frame. Moose's method does not suggest a way to determine symbol timing while Classen's method requires searching for a cancellation of two identical symbols after correcting for the phase shift introduced by the carrier frequency offset. This technique requires the re-computation of a correction factor for every new set of samples and is, therefore, tremendously computationally complex. Furthermore, neither author suggests an effective technique for estimating carrier frequency offset greater than one half of a sub-channel bandwidth. Consequently, the methods would not be suitable to the reception of OFDM digital TV signals. Classen does suggest a trial-and-error method for estimating carrier frequency offsets greater than one half of a sub-channel bandwidth by searching in increments of 0.1 sub-channel bandwidths. Such a method, however, is very slow and computationally complex, especially for offsets of several sub-carrier bandwidths.

The prior art also suggests an approach to timing and synchronization for OFDM based on the cyclic prefix contained in the guard interval $T_g$. For example, in "A New Frequency Detector for Orthogonal Multicarrier Transmission Techniques", IEEE 45th Vehicular Technology Conference, 2:804–809, Jul. 25–28, 1995, F. Daffra et al. describe a method using a correlation with the cyclic prefix to find the carrier frequency offset if it is less than ½ of the sub-carrier spacing and the symbol timing is known. Unfortunately, this method is limited to an acquisition range of ±½ of the sub-channel spacing.

Another method of using the cyclic prefix is described by M. Sandell et al. in "Timing and Frequency Synchronization in OFDM Systems Using the Cyclic Prefix", Proceedings IEEE International Symposium on Synchronization, pp. 16–19, Dec. 1995. Again, the estimate of the carrier offset using this technique is valid only if the offset can be guaranteed to be less than ½ of the sub-carrier spacing.

Additional prior art is also discussed by the inventors in "Low-overhead, Low-complexity Burst Synchronization for OFDM", IEEE International Conference on Communications (ICC), 3:1301–1306, Jun. 23–27, 1996 and in U.S. Pat. No. 5,732,113.

Unfortunately, in many practical situations the carrier offset is large. In particular, when dealing with OFDM systems the offset can be significantly larger than ½ of the sub-carrier spacing. Thus, what is required is an approach which increases the carrier frequency acquisition range in RF communications systems without relying on training symbols. Such an approach would accommodate transmission of more data in the same bandwidth. Specifically, in application to OFDM systems an increased carrier frequency acquisition range would improve the efficiency of OFDM communications systems.

OBJECTS AND ADVANTAGES

In view of the above short-comings of the prior art, it is an object of the present invention to provide a method and apparatus for determining large carrier frequency offsets in RF signals. In particular, in application to OFDM systems the method and apparatus of invention are designed to increase the carrier frequency acquisition range significantly beyond ±½ sub-carrier spacings and preferably to a significant fraction of the total bandwidth of the OFDM signal.

It is another object of the invention to provide improved carrier frequency offset determination for purposes of achieving rapid and efficient timing and synchronization of RF signals, and especially OFDM signals. In particular, the method of the invention provides that the carrier offset to be found without the use of training symbols. Synchronization information can be derived by taking samples from any window with a length of a few symbols without waiting for a training symbol, thus reducing delay.

It is a further object of the present invention to ensure that the method is easy to implement and robust. The apparatus of the invention should be simple in construction and straightforward to implement, especially in OFDM systems. Yet another object of the invention is to provide for the method and apparatus of the invention to support carrier frequency offset computation in continuous transmission systems such as digital TV, and systems transmitting data in random bursts, e.g., WLANS.

Still another object of the invention is to adapt the method and apparatus for use in OFDM systems employing phase-shift keying as well as amplitude and phase-shift keying of symbols.

These and other object and advantages of the invention will be better appreciated after reading the detailed specification.

SUMMARY

These objects and advantages are attained by a method of determining an integral portion of a carrier offset $\Delta f_c$ of a signal transmitted from a transmitter at a transmit carrier frequency $f_{ct}$. The signal consists of at least two data symbols $S_1$ and $S_2$, each having a useful part preceded by a cyclic prefix. In the time domain the useful part occupies a symbol interval $T_s$ and the cyclic prefix occupies a guard interval $T_g$.

In accordance with the method, the first and second data symbols $S_1$ and $S_2$ are received at a receive carrier frequency $f_{cr}$ and the integral portion of the carrier offset $\Delta f_c$ between the receive carrier frequency $f_{cr}$ and the transmit carrier frequency $f_{ct}$ is calculated in the form of an integral multiple of the inverse $1/T_s$ of the symbol interval.

In the preferred embodiment the method of the invention is applied to data symbols which are multiplexed by the orthogonal frequency division multiplexing (OFDM) technique. In this case signals $S_1$ and $S_2$ are constructed from sub-symbols $c_k$ which are modulated on corresponding sub-carrier frequencies $f_k$ and transmitted in corresponding sub-channels. It is important that sub-symbols $c_k$ belong to a $2^m$-ary constellation of complex values equally spaced in phase. For example, the $2^m$-ary constellation can be a phase-shift keyed (PSK) constellation such as BPSK, QPSK, DQPSK, 8-PSK, 8-DPSK, 16-PSK and 16-DPSK. Alternatively, the $2^m$-ary constellation can be an amplitude and phase-shift keyed (APSK) constellation such as of 16-APSK, 16-DAPSK, 64-APSK and 64-DAPSK.

The spacing of sub-carrier frequencies of the OFDM signal should be equal to $1/T_s$, i.e., for OFDM signals the integral carrier offset $\Delta f_c$ is determined in terms of and integral number of sub-carrier spacings.

Whether the signal is an OFDM signal or a different type of signal, the cyclic prefix contains a tail portion of the useful part of the symbol. In other words, the last portion of the signal transmitted during symbol interval $T_s$ is repeated during guard interval $T_g$.

The sampling of data symbols $S_1$ and $S_2$ should be performed such that a number N of samples is taken during the symbol interval $T_s$ and a number G of samples is taken during the guard interval $T_g$. Both numbers N and G are integers and G is preferably an odd integer. This can be ensured, e.g., by adjusting the length of guard interval $T_g$ Preferably, N is a power of 2.

Preferably, the carrier offset $\Delta f_c$ is calculated in two portions; the integral portion and a fractional portion. In the event of OFDM signals, both portions can be expressed interms of sub-carrier spacings as $\Delta f_c = (z+y)/T_s$, where z is an integer and y is a fraction such that $|y| \leq \frac{1}{2}$. In any event, the total carrier offset $\Delta f_c$ is typically used for blind synchronization of the receiver with the transmitter.

The apparatus or circuit of the invention carries out the above method with the aid of a receiver equipped with a computing unit which calculates the integral portion of the carrier offset $\Delta f_c$ by processing data symbols $S_1$ and $S_2$. The circuit also has a synchronizing circuit which uses the integral portion of the carrier offset $\Delta f_c$ in conjunction with the fractional portion, which is computed by a sub-circuit, for blind synchronization of the receiver with the transmitter.

The details of the invention are set forth in the detailed description with the aid of the attached drawing figures.

DESCRIPTION OF THE FIGURES

FIG. 1 is a schematic view of a data frame containing symbols formatted according to the prior art.

FIG. 2 is a schematic view of two symbols formatted according to the method of the invention.

DETAILED DESCRIPTION

Several aspects of the present invention as applied to OFDM signals are described in "Blind Synchronization for OFDM", Electronics Letters, Vol 33, No. 2, Jan 16, 1997, pp. 113–114 which is herein incorporated by reference.

In the most general application, the method of the invention applies to any RF signals composed of individual symbols transmitted from a transmitter to a receiver and formatted as shown in FIG. 2. In the time domain, a first symbol $S_1$ and a second symbol $S_2$ are formatted in the same manner. Each has a cyclic prefix 20 contained in a guard interval $T_g$ preceding a useful symbol 22 contained in a symbol interval $T_s$. Cyclic prefix 20 is identical to a tail portion 24 of useful symbol 22. FIG. 2 also indicates the number of samples taken at the receiver during each interval. Specifically, an integral number G of samples is taken during guard interval $T_g$ and a number N of samples is taken during symbol interval $T_s$. Of course, an entire data frame usually contains more than two symbols $S_1$, $S_2$. However, in accordance with the invention, as few as two symbols are required for determining an integral portion of a carrier offset $\Delta f_c$, as described below.

Figure 3:
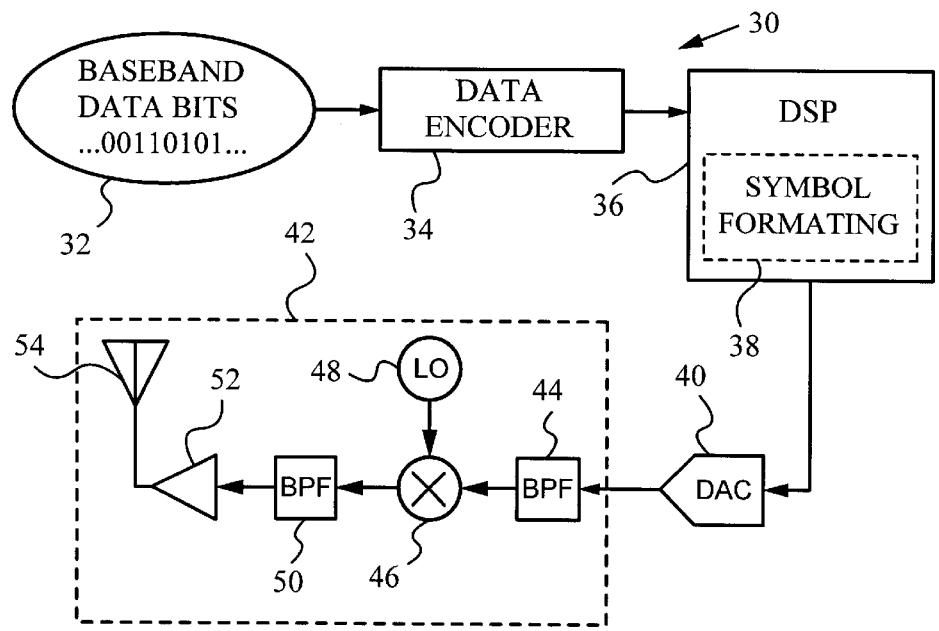
FIG. 3 is a block diagram illustrating a transmitter for transmitting symbols formatted according to the invention.

FIG. 3 shows in the form of a block diagram a transmitter 30 for transmitting symbols $S_1$, $S_2$. Transmitter 30 receives baseband data bits 32 and encodes them in data encoder 34. Specifically, encoder 34 takes segments of bits 32 every $T_g + T_s$ seconds and uses any suitable scheme, which may involve any coding including introduction of error-correcting and/or error-detecting redundancy into the segments of bits 32.

A digital signal processing unit (DSP) 36 with a symbol formatting circuit 38 receives the coded segments of bits 32, performs the required spectral shaping and formats them such that a copy of tail portion 24 of each signal is contained in cyclic prefix 20. Next, the formatted signals are converted to an analog signal by a digital-to-analog converter (DAC) 40 and modulated on a transmit carrier frequency $f_{ct}$ by modulating circuit or RF transmitter 42. This is done by first passing the converted analog signal through a band pass filter 44 to eliminate noise, and modulating it in mixer 46 with a transmit carrier frequency $f_{ct}$ generated by a clock 48.

An RF bandpass filter 50 eliminates noise from the modulated signals and passes them to an RF power amplifier 52. Power amplifier 52 delivers amplified symbols $S_1$ and $S_2$ modulated at transmit carrier frequency $f_{ct}$ to an antenna 54 for transmission. A person of average skill in the art will appreciate that transmitter 30 can be modified in many ways, depending on the situation, to perform the above-described functions.

Figure 4:
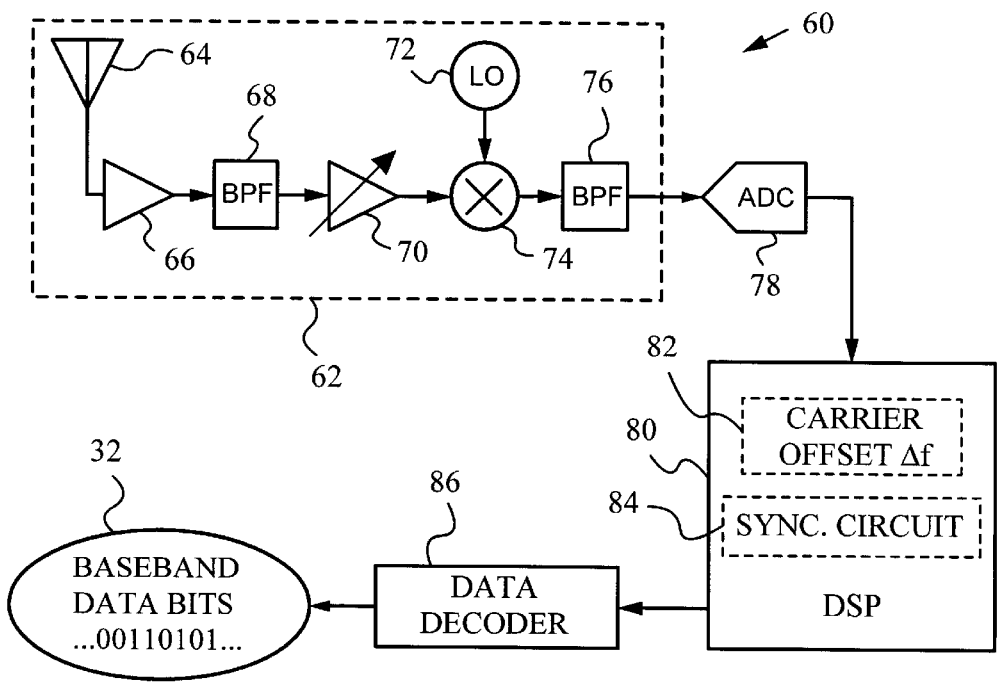
FIG. 4 is a block diagram illustrating a receiver for receiving symbols formatted according to the invention.

If transmitted symbols $S_1$, $S_2$ pass through an additive white Gaussian noise (AWGN) channel, cyclic prefix 20 will be identical to tail portion 24. The only difference will be due to a phase shift caused by a carrier offset $\Delta f_c$ when symbols $S_1$, $S_2$ are received by a receiver 60 as shown in FIG. 4. With a multipath channel, there will still be a strong correlation between 20 and 24 and the phase shift caused by carrier offset $\Delta f_c$ will still be present.

In order to receive signals $S_1$, $S_2$ receiver 60 must perform essentially the inverse of all the operations performed by transmitter 30. Thus, receiver 60 has an RF receiver 62 equipped with an antenna 64, a low noise amplifier 66, an RF bandpass filter 68 and an automatic gain control (AGC) circuit 70 for receiving, amplifying and eliminating noise from symbols $S_1$, $S_2$. RF receiver 60 uses a local oscillator 72 for supplying a receive carrier frequency $f_{cr}$ to demodulate symbols $S_1$, $S_2$ in a mixer 74 and removes noise created during demodulation by bandpass filter 76. Under normal operating conditions, receive carrier frequency $f_{cr}$ is not exactly matched to transmit carrier frequency $f_{ct}$. This is mostly due to tolerances of local oscillators 48 and 72, the varying external parameters under which they operate and other factors. Thus, there is a carrier offset $\Delta f_c = f_{cr} - f_{ct}$ whose magnitude will typically vary with time.

Offset $\Delta f_c$ causes a phase rotation in the time domain of $2\pi t \Delta f$.

Next, demodulated signals $S_1$, $S_2$ are converted to digital form by an analog-to-digital converter (ADC) 78 and passed on to a digital signal processor (DSP) 80. During the conversion, an integral and preferably odd number G of samples is taken during guard interval $T_g$ and an integral number N of samples is taken during symbol interval $T_s$.

DSP 80 has a carrier offset $\Delta f_c$ computing unit 82 which treats carrier offset $\Delta f_c$ as a combination of an integral portion and a fractional portion. In particular, unit 82 considers $\Delta f_c$ to be described by:

$$\Delta f = \frac{(z+y)}{T_s},$$

where z is an integer and y is a fraction such that $|y| \leq \tfrac{1}{2}$. The fractional part of offset $\Delta f_c$, i.e., $y/T_s$ and the timing of symbols $S_1$, $S_2$ are found by using any of the available prior art techniques.

The integer z is found by measuring the excess phase rotation which occurs during guard interval $T_g$. After removing the effect of fractional portion of carrier offset $\Delta f_c$ by multiplying the received samples in the time-domain by $\exp(-j2\pi ty/T_s)$, the resulting signal is applied to a bank of matched filters (not shown) with frequencies which are multiples of $1/T_s$. This can be efficiently implemented with a fast Fourier transform when the number of frequencies is large. When the signal is a single carrier signal, then the bank of matched filters may only contain a few matched filters. The sub-carrier modulation is removed, e.g., by raising the outputs of the matched filters to the appropriate power of 2, and then the phase differences between consecutive symbols $S_1$, $S_2$ are computed. This excess phase caused by the presence of guard interval $T_g$ is then used to determine integer portion $z/T_s$ of carrier offset $\Delta f_c$.

A synchronization circuit 84 uses computed carrier offset $\Delta f_c$ to synchronize symbols $S_1$, $S_2$ for further operations performed by DSP 80 to retrieve bit segments from symbols $S_1$, $S_2$. The bit segments are sent to data decoder 86 which converts them to the original sequence of baseband data bits 32. A person of average skill in the art will appreciate that receiver 60 can be modified in many ways, depending on the situation, to perform the above-described functions.

The preferred application of the method of invention is for orthogonal frequency division multiplexed (OFDM) symbols $S_1$, $S_2$. The main limitation on symbols $S_1$, $S_2$ in this case is that sub-symbols $c_k$ making up the symbols $S_1$, $S_2$ must be members of $2^m$-ary constellations of complex values equally spaced in phase. In other words, sub-symbols $c_k$ modulated on corresponding sub-carriers $f_k$ and transmitted in corresponding sub-channels have to be phase-shift keyed (PSK) or amplitude and phase-shift keyed (APSK) in constellations which impose equal phase spacing between different sub-symbol values.

Figure 5:
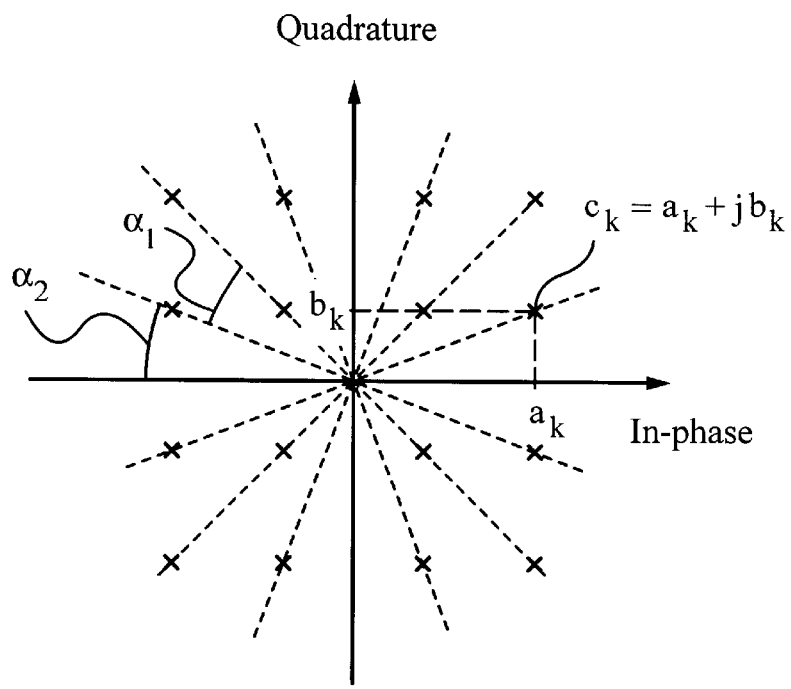
FIG. 5 is a constellation diagram showing a prior art OFDM keyed sub-symbol.
Figure 6A:
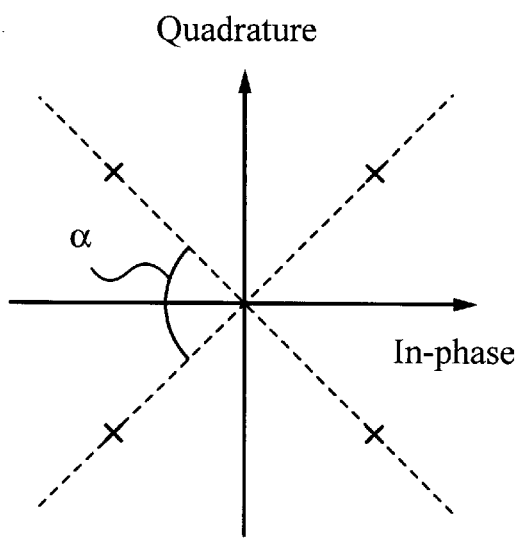
FIGS. 6A–B are constellation diagrams showing phase-shift keyed sub-symbols and amplitude and phase-shift keyed sub-symbols according to the invention.
Figure 6B:
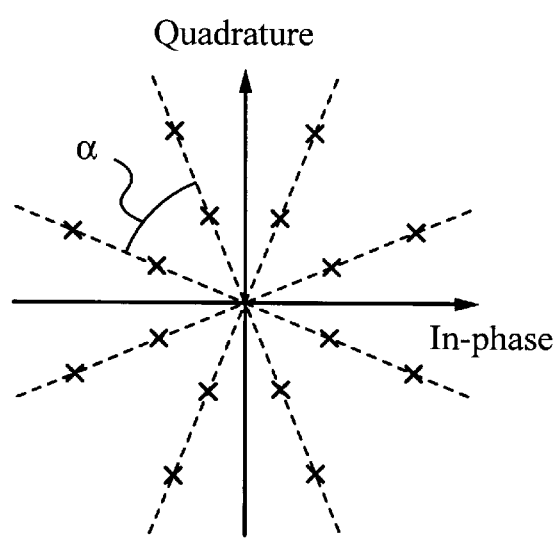

FIGS. 5 and 6A–B illustrate this limitation. FIG. 5 shows a constellation used for 16-point quadrature amplitude modulation (16-QAM) in accordance with the prior art. Each possible sub-symbol value or point $c_k$ is a complex number having an in-phase component $a_k$ and a quadrature component $b_k$. The dashed lines are drawn in to illustrate the phase relationship between the points. Clearly, this constellation does not fit the criterion of having equally spaced points in phase, because some points is are spaced by $\alpha_1 = 26.565°$ and some points are spaced by $\alpha_2 = 36.870°$.

FIGS. 6A and B illustrate constellations for quadrature phase-shift keying (QPSK) and 16-point amplitude and phase-shift keying (16-APSK). In both of these constellations angle a between the points is equal. Specifically, the, angle is $\alpha = 90$ for QPSK and $\alpha = 45°$ for 16-APSK. Hence, these constellations can be used in keying sub-symbols $c_k$. Other PSK constellations satisfying this criterion include BPSK, QPSK, DQPSK, 8-PSK, 8-DPSK, 16-PSK and 16-DPSK. Also, 16-APSK, 16-DAPSK, 64-APSK and 64-DAPSK are APSK constellations which fulfill the criterion. A person of average skill in the art will recognize that other constellations satisfying the equal phase separation of points can be constructed and used for keying sub-symbols $c_k$ according to the invention.

Figure 8:
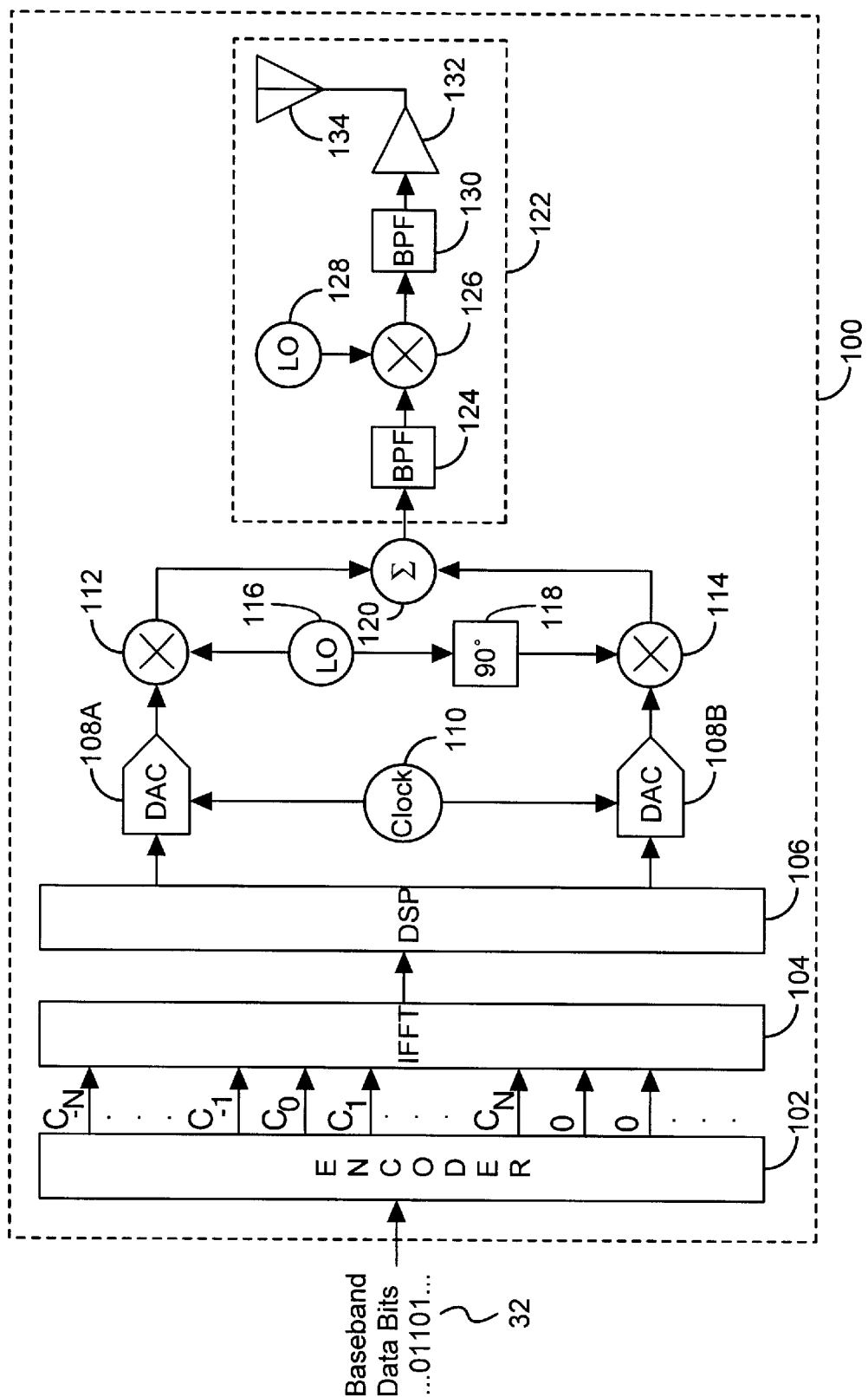
FIG. 8 is a block diagram of a transmitter for transmitting OFDM signals according to the invention.

An exemplary OFDM transmitter 100 for transmitting an OFDM signal composed of symbols formatted according to the invention is shown in FIG. 8. Transmitter 100 receives baseband data bits 32 and passes them to an encoder 102, which takes bits 32 in segments of B bits every $T_g + T_s$ seconds. Encoder 102 can use a block and/or convolution coding scheme to introduce error-correcting and/or error-detecting redundancy into the segments of B bits. Such schemes are known to a person skilled in the art.

Encoder 102 then subdivides the coded bits into 2L+1 sub-segments of m bits. The integer m typically ranges from 2 to 6. Next, encoder 102 transforms the 2L+1 sub-segments of m bits into complex-valued points $c_k = a_k + jb_k$ according to a PSK constellation or an APSK constellation having points equally spaced in phase, as described above. The keying procedure yields at the outputs of encoder 102 2N+1 OFDM sub-symbols $c_k$. Any additional zero-valued sub-symbols $c_k$ may be included, as necessary, for interpolation to simplify filtering as is known in the art.

The outputs of encoder 102 deliver sub-symbols $c_k$ to an inverse fast Fourier transformer (IFFT) 104. The latter performs an inverse fast Fourier transform on the sequence of sub-symbols $c_k$. In other words, IFFT 104 uses each of the complex-valued sub-symbols $c_k$ to modulate the phase and/or the amplitude of a corresponding one of 2L+1 sub-carrier frequencies over symbol interval $T_s$, thereby creating useful portion 22 of an OFDM symbol.

Figure 7:
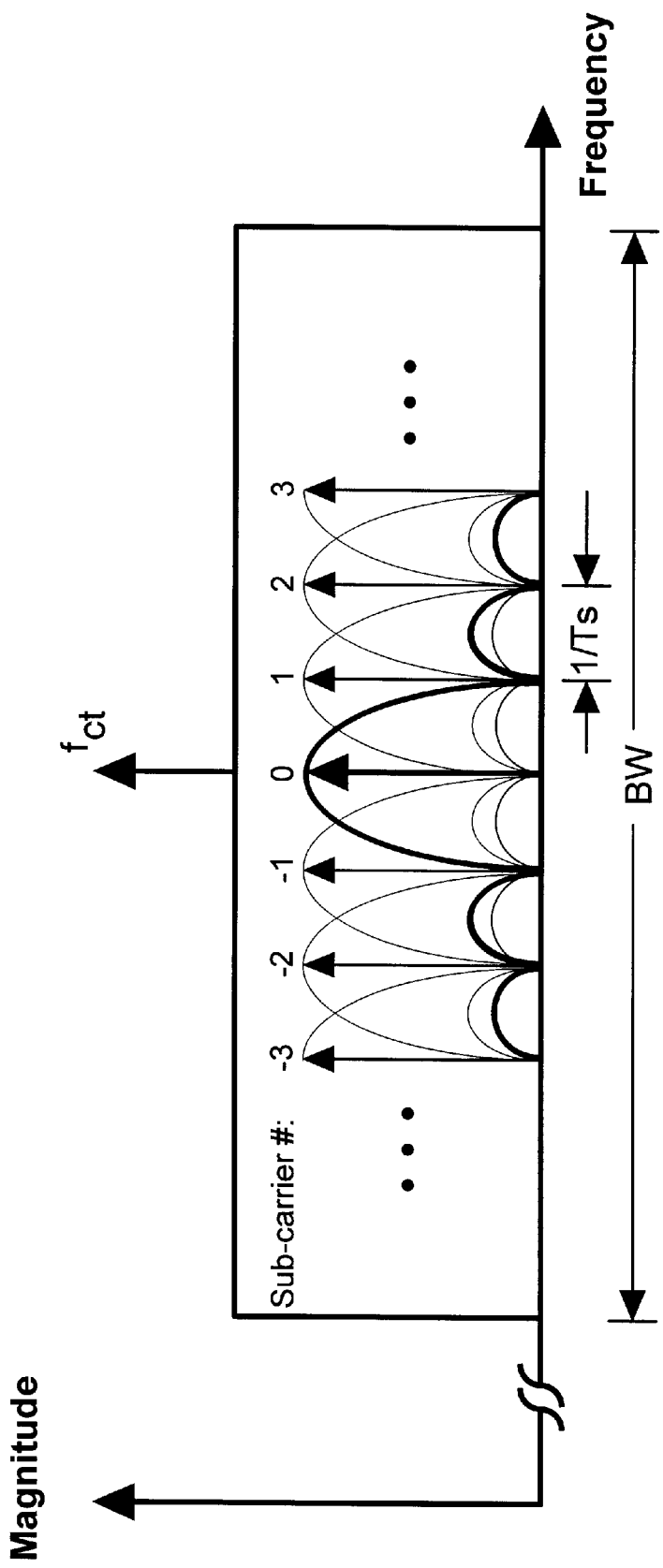
FIG. 7 is a graph in frequency space illustrating the sub-carrier spacing of an OFDM signal.

FIG. 7 is a graph in the frequency domain illustrating the sub-carriers which carry sub-symbols $c_k$ making up useful symbol 22. The remaining sub-carriers are centered around transmit carrier frequency $f_{ct}$ and spaced by a sub-channel spacing equal to the inverse of symbol interval $T_s$, i.e., $1/T_s$. The sub-carriers are described by the functions $\exp(-2\pi j f_k t)$, and therefore, have baseband frequencies of $f_k = k/T_s$, where k is the frequency number and is an integer in the range $-N \leq k \leq N$. When transformed into the time domain by an inverse fast Fourier transformer (IFFT) the OFDM symbol fills symbol interval $T_s$ as described by:

$$u(t) = \sum_{k=-L}^{L} c_k \exp(-2\pi f_k t)$$

$$0 \leq t \leq T_s$$

As a result of this discrete-valued modulation of the OFDM sub-carriers by frequency-domain sub-symbols $c_k$ over symbol interval $T_s$ the OFDM sub-carriers display a sinc x=(sin x)/x spectrum which ensures that despite spectral overlap the sub-carriers remain orthogonal with respect to each other. In this configuration the sub-carriers efficiently fill the channel bandwidth BW of the OFDM signal.

Referring back to FIG. 8, useful portion 22 of digital time-domain OFDM symbol generated by IFFT 104 is sent to a digital signal processor (DSP) 106. DSP 106 performs additional spectral shaping of the OFDM symbol and adds cyclic prefix 20 during guard interval $T_g$ before symbol interval $T_s$ occupied by useful part 22 of the OFDM symbol. In particular, DSP 106 duplicates tail portion 24 of the OFDM symbol and uses it as cyclic prefix 20. The length of guard interval $T_g$ should be longer than the OFDM channel impulse response in order to prevent inter-symbol interference (ISI) between consecutive symbols, e.g., first and second symbols $S_1$ and $S_2$.

The time-domain OFDM symbol generated by DSP 106 made up of the real and imaginary-valued digital components that constitute cyclic prefix 20 and useful portion 22 is fed to two digital to analog converters (DAC) 108A, 108B, respectively. DACs 108A, 108B convert the real and the imaginary-valued digital components of the time-domain OFDM symbol into in-phase and quadrature OFDM analog signals, respectively, at a conversion or sampling rate $f_{ck-t}$ as determine by a clock 110. The in-phase and quadrature components of the OFDM signal are then passed to mixers 112, 114, respectively.

In mixers 112, 114 the in-phase and quadrature components of the OFDM signal from DACs 108A, 108B are used to modulate an in-phase intermediate frequency (IF) signal and a 90° phase-shifted (quadrature) IF signal, respectively, in order to produce an in-phase IF OFDM signal and a quadrature IF OFDM signal, respectively. The in-phase IF signal that is fed to mixer 112 is produced directly by a local oscillator 116, while the 90° phase-shifted IF signal that is fed to mixer 114 is produced by passing the in-phase IF signal produced by local oscillator 116 through a 90° phase-shifter 118 before feeding it to mixer 114. The in-phase and quadrature IF OFDM signals are then combined in a combiner 120 to form a composite IF OFDM signal. A person of average skill in the art will realize that IF mixing can also be performed in the digital domain using a digital synthesizer and digital mixers before the digital-to-analog conversion is performed.

The composite IF OFDM signal is passed to an RF transmitter 122, analogous to RF transmitter 42. Of course, many variations of RF transmitter 122 exist and a person of average skill in the art will be able to select the proper one given the particular operating conditions and other relevant parameters. In this case, RF transmitter has an IF bandpass filter 124, an RF mixer 126, a local oscillator 128 for producing RF transmit carrier frequency $f_{ct}$, an RF bandpass filter 130, an RF power amplifier 132 and an antenna 134. RF transmitter 122 takes the IF OFDM signal from combiner 120 and uses it to modulate transmit carrier frequency $f_{ct}$ to produce an RF OFDM signal that occupies channel bandwidth BW (see FIG. 7). Since the entire OFDM symbol must fit within channel bandwidth BW, the latter has to be at least $(1/T_s) \cdot (2N+1)$ Hz wide. This width will ensure that all the modulated OFDM sub-carriers are accommodated. Thus modulated, the RF OFDM symbol is transmitted on RF transmit carrier frequency $f_{ct}$ from antenna 134 via a channel to a receiver.

In alternative embodiments of RF transmitter 122, the OFDM symbol is used to modulate $f_{ct}$ using frequency modulation (FM), single-sideband modulation (SSB) or other modulation techniques. Therefore, the resulting RF OFDM modulated carrier may not necessarily have the exact shape of the RF OEDM-modulated carrier illustrated in FIG. 7 (i.e., the RF OFDM-modulated carrier may not be centered around transmit carrier $f_{ct}$, but instead may lie to either side of it).

Figure 9:
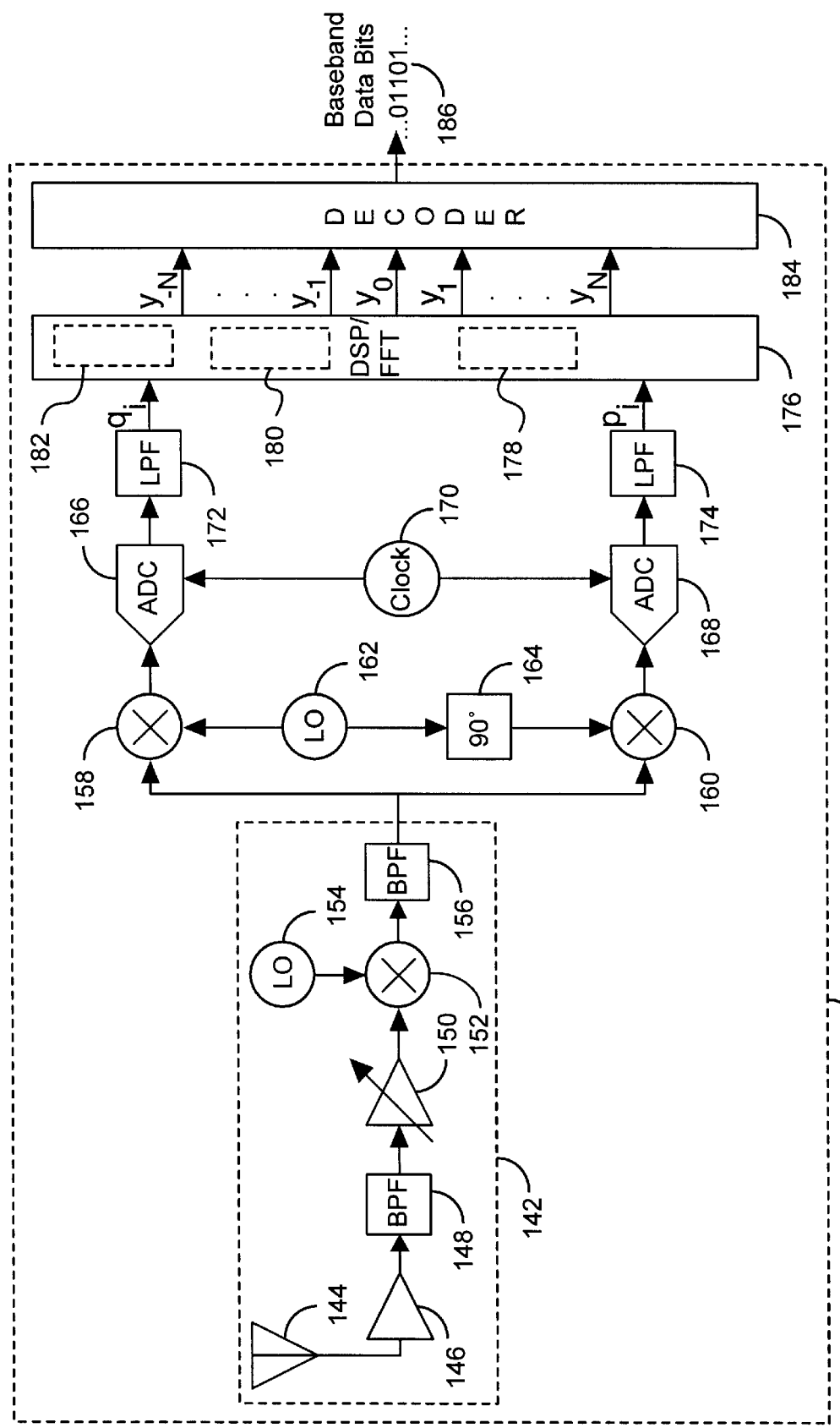
FIG. 9 is a block diagram of a receiver for receiving OFDM signals according to the invention.

An exemplary receiver 140 for receiving the RF OFDM signal is shown in FIG. 9. Receiver 140 has an RF receiver 142 which has an antenna 144, a low-noise amplifier (LNA) 146, an RF bandpass filter 148, an automatic gain control (AGC) 150, an RF mixer 152, an RF local oscillator 154, and an IF bandpass filter 156. RF receiver 140 couples in the RF OFDM modulated carrier through antenna 142 and submits it to amplification by amplifier 146, filtering by filter 148 and gain adjustment by AGC 150. Then, the RF OFDM signal is mixed with a receive carrier frequency $f_{cr}$ generated by RF local oscillator 154, to downconvert the RF OFDM signal to a received IF OFDM signal. Once again, carrier offset $\Delta f_c$ is due mainly to the frequency difference between the receive carrier frequency $f_{cr}$ and transmit carrier frequency $f_{ct}$.

The IF OFDM signal is delivered to mixers 158, 160 to be mixed with an in-phase IF signal and a 90° phase-shifted (quadrature) IF signal, respectively, to produce in-phase and quadrature OFDM signals, respectively. The in-phase IF signal for mixer 158 is produced by a local IF oscillator 162. The 90° phase-shifted IF signal for mixer 160 is derived from the local IF oscillator 162 by passing it through a 90° phase shifter 164.

The in-phase and quadrature OFDM signals then pass to analog-to-digital converters 166, 168, respectively, where they are digitized at a sampling rate $f_{ck-r}$, as determined by a clock 170. ADCs 166, 168 produce digital samples that form an in-phase and a quadrature discrete-time OFDM signal, respectively. The difference between the sampling rates of receiver 140 and transmitter 100 is the sampling rate offset $\Delta f_{ck} = f_{ck-r} - f_{ck-t}$.

The unfiltered in-phase and quadrature discrete-time OFDM signals from ADCs 166, 168 then pass through digital low-pass filters 172, 174, respectively. The output of filters 172, 174 are filtered in-phase and quadrature samples, respectively, of the received OFDM signal. In this way, the received OFDM signal is converted into in-phase ($q_i$) and quadrature ($p_i$) samples that represent the imaginary and real components, respectively, of the complex-valued OFDM signal, $r_i = q_i + j p_i$. These samples of the received OFDM signal are next supplied to DSP 176. Note that in some implementations of receiver 140 the analog-to-digital conversion is done before the IF mixing process. In such implementations the mixing process involves the use of digital mixers and a digital frequency synthesizer. Also note that in many alternative implementations of receiver 140 the digital-to-analog conversion is performed after filtering.

DSP 176 performs a number of operations on the in-phase and quadrature samples of the received OFDM signal. First, DSP 176 synchronizes receiver 140 to the timing of the data frames and the timing of symbols $S_1$, $S_2$ contained in the OFDM signal. This can be performed by a known method, e.g., the one described by M. Sandell et al. in "Timing and Frequency Synchronization in OFDM Systems Using the Cyclic Prefix", Proceedings IEEE International Symposium on Synchronization, pp. 16–19, Dec. 1995.

Next, DSP 176 estimates and corrects for carrier offset $\Delta f_c$. In accordance with the invention, this is done in two steps, since carrier offset $\Delta f_c$ is treated by DSP 176 as a combination of an integral portion and a fractional portion. In particular, unit DSP 176 considers $\Delta f_c$ to be described by:

$$\Delta f = \frac{(z+y)}{T_s},$$

where z is an integer and y is a fraction such that $|y| \leq \frac{1}{2}$. The fractional part of offset $\Delta f_c$, i.e., $y/T_s$ can be found using a known method, e.g., analogous to the one described in the above-cited article by M. Sandell et al.

Specifically, when operating receiver 140 the sampling rate of ADCs 166, 168 is adjusted via clock 170 such that an integral number N of samples is taken during symbol interval $T_s$ and an integral and preferably odd number G of samples is taken during guard interval $T_g$. Once again, the OFDM signal can be assumed to have passed through an AWGN channel, and thus cyclic prefix 20 and tail portion 24 of OFDM symbols $S_1$, $S_2$ are identical, except for a phase shift $\theta$ caused by carrier offset $\Delta f_c$. Even with a frequency selective channel, there will still be a strong correlation between these two sets of samples. The time index d which maximizes the equation:

$$\lambda(d) = \left| \sum_{m=0}^{G-1} (r^*_{d+m} r_{d+m+N}) \right|^2$$

gives an estimate of the start of guard interval $T_g$, and for this value of d, the fractional portion of carrier offset $\Delta f_c$ (in sub-channel spacings, $1/T_s$) is estimated by:

$$\frac{1}{2\pi} angle \left( \sum_{m=0}^{G-1} (r^*_{d+m} r_{d+m+N}) \right)$$

These estimates are obtained from symbols $S_1$ and $S_2$, but more symbols can be used to get more accurate estimates. This procedure is analogous to the one described by M. Sadell and is only valid for computing fractional portion y of carrier offset $\Delta f_c$. DSP 176 has a sub-circuit 178 for computing this fractional portion y of carrier offset $\Delta f_c$ and the symbol timing.

To obtain the integer portion of carrier offset $\Delta f_c$ DSP 176 performs the following additional functions in a computing circuit 180. First, fractional portion y of carrier offset $\Delta f_c$ is corrected by multiplying the samples in the time-domain by $\exp(-j2\pi t y/T_s)$ so that only integer portion z of carrier offset $\Delta f_c$ remains. Then, DSP 176 takes the fast Fourier transforms of symbols $S_1$, $S_2$, and the frequency components for sub-channel k obtained for these symbols are $x_{1,k}$ and $X_{2,k}$, respectively.

Although the method of the invention will work for any keying using constellations with points equally spaced in phase, the method is further explained using DQPSK modulation (see FIG. 6A). The phase difference between sub-symbols $c_k$ in symbols $S_1$, $S_2$ due to the modulation is in the set $\{0, \pi/2, \pi, 3\pi/2\}$. There is also a phase difference caused by the yet uncompensated integral portion $z/T_s$ of carrier offset $\Delta f_c$ of $2\pi(T_s+T_g)z/T_s$. To eliminate the effect of DQPSK modulation circuit 180 multiplies the phase difference by 4 to obtain the remaining phase difference $\theta=8\pi(T_s+T_g)z/T_s$. This phase difference is estimated by circuit 180 using the maximum likelihood estimator (MLE). The sub-channels k numbered from -L to L yield the following MLE for $\theta$:

$$\hat{\theta} = angle\left( \sum_{k=-L}^{L} |x^*_{1,k} x_{2,k}| \exp(j\, angle((x^*_{1,k} x_{2,k})^4)) \right)$$

which simplifies to:

$$\hat{\theta} = angle\left( \sum_{k=-L}^{L} \frac{(x^*_{1,k} x_{2,k})^4}{|x^*_{1,k} x_{2,k}|^3} \right).$$

In order for DSP 176 to process symbols $S_1$, $S_2$ sufficiently rapidly, the above equation is preferably solved by using lookup tables and approximations which can be stored in a memory unit (not shown). For example, the weighting values do not have to be exact to get good estimates. The greater of the two values $|x^*_{1,k}|^2$ and $|x_{2,k}|^2$ can be computed for each sub-channel, and based on this a lookup table can give a number of bit shifts (division by a power of 2) so no actual division has to be performed by circuit 180. The arctangent function is preferably computed by using a lookup table combined with interpolation to get the required precision. A person of average skill in the art will appreciate that there are many ways of efficiently performing this computation in real-time.

The length of guard interval $T_g$ is chosen such that the estimate of $\theta$ can be used to determine integer portion z of frequency offset $\Delta f_c$. Preferably, the length of symbol interval $T_s$ includes N samples, where N is a power of 2. Under these conditions DSP 176 can efficiently employ the FFT algorithm. Guard interval $T_g$ contains G samples, so that receiver 140 can sample incoming symbols $S_1$, $S_2$ at a constant rate, i.e., keep clock 170 operating at a set frequency.

Figure 10:
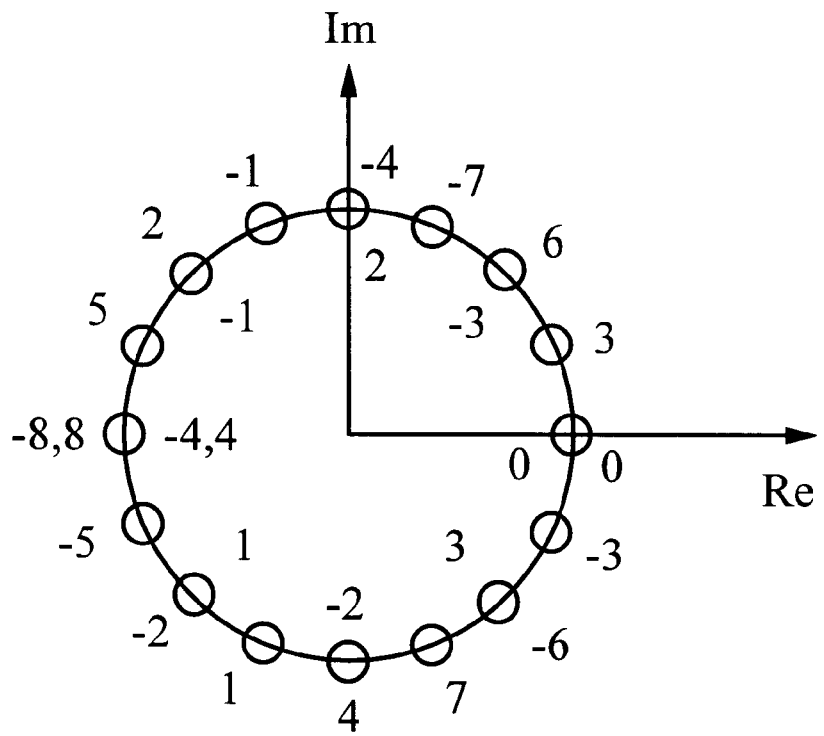
FIG. 10 is a graph illustrating the locus of points for a phase difference between two OFDM symbols.

The locus of points $e^{j\theta}$ visualizing the phase difference between symbols $S_1$ and $S_2$ from which the integral part of carrier offset is derived by circuit 180 is plotted in FIG. 10. For purposes of illustration, the OFDM signals have 64 sub-carriers and are sampled such that N=64 and G=11 (outside of the circle) and N=64 and G=10 (inside the circle). When N and G are relatively prime (i.e., G is odd), then there is a unique point on the circle in the complex plane for each value of z from (-N/8+1) to (N/8-1). Hence, it is preferred that the duration of guard interval $T_g$ be adjusted such that G is an odd number. The acquisition range for carrier offset $\Delta f_c$ is limited to these values because the phase was multiplied by a factor of 4.

The integer portion $z/T_s$ of carrier offset $\Delta f_c$ is determined by finding the closest point to $e^\theta$ in FIG. 10. In the present example, when N=64 and G=11 then $\hat{\theta}=0.768$ radians (44 degrees) which corresponds to $\hat{z}=6$. This translates into an integral offset of 6 sub-carrier spacings. In other words, integral portion $z/T_s$ of carrier offset $\Delta f_c$ is calculated to within $\pm\frac{1}{8}$ of the entire bandwidth BW of the OFDM signal.

DSP 176 adds the integral portion $z/T_s$ obtained from circuit 180 and fractional portion $y/T_s$ obtained from circuit 178 to obtain the total carrier offset $\Delta f_c$ and uses this value for synchronization purposes. Specifically, DSP 176 has a synchronization circuit 182 which uses the computed carrier offset $\Delta f_c$ to remove the offset.

In a final set of steps to recover baseband data bits 186 DSP 176 removes cyclic prefix 20 from symbols $S_1$, $S_2$, computes the discrete Fourier transform or preferably the fast Fourier transform to recover the sequences of frequency-domain OFDM sub-symbols $y_k$ that were used to modulate the sub-carriers during each OFDM symbol interval $T_s$, and performs any required channel equalization on the sub-carriers onto which sub-symbols $y_k$ were modulated. Lastly, DSP 176 passes the sequence of sub-symbols yk to a decoder 184. By decoding retrieved sub-symbols $y_k$ a decoder 184 is able to recover baseband data bits 186. Ideally, bits 186 match exactly the original stream of bits 32. The decoding process can include soft Viterbi decoding and/or Reed-Solomon decoding, for example, to recover the data from the block and/or convolutionally encoded sub-symbols $c_k$.

Since no training data is included in symbols $S_1$, $S_2$ this kind of synchronization represents a considerable improvement over the prior art. Furthermore, the method is not limited to determination of carrier offsets within $\pm\frac{1}{2}$ sub-carrier spacings. In fact, for an OFDM signal with 256 sub-carriers in a 1 MHz bandwidth the method of the invention provides for a frequency acquisition range of ±123 kHz while the prior art methods are limited to ±1.95 kHz. In a wireless system operating at a carrier frequency of 2 GHz or higher, and the typical maximum frequency offset for an oscillator used in the RF transmitters and RF receivers being about $10^{-5}$ of the carrier frequency, the maximum carrier offset could be up to 20 kHz. A similar system operating at 5 GHz could have a carrier offset of 50 kHz. Clearly, the method and apparatus of the invention can be successfully employed in such systems.

The method and apparatus of the invention provide for improved carrier frequency offset determination which allows one to achieve rapid and efficient timing and synchronization of RF signals, and especially OFDM signals. The method and apparatus are robust and simple to implement and can be effectively used to support carrier frequency offset computation in continuous transmission systems such as digital TV, and systems transmitting data in random bursts, e.g., WLANs.

In applying the method of the invention to different types of constellations the phase differences between symbols $S_1$ and $S_2$ would by multiplied by different factors. For example, in 8-PSK the factor is 8, and the frequency acquisition range is about $\pm\frac{1}{16}$ of the OFDM signal bandwidth BW.

In situations where the locus of points for $\theta$ is too closely spaced to accurately determine z, the length of guard interval $T_g$ (in samples) can have a factor which is a power of 2. This will shorten the frequency acquisition range by about a power of 2, but will also space the phase differences $\theta$ wider apart by the same power of 2. The inside of the circle in FIG. 10 illustrates the situation when one power of 2 is included in the length of guard interval $T_g$.

A further extension that will be useful in many situations is to employ more than two symbols to estimate the integer portion of the carrier offset. Adjacent symbols have one guard interval $T_g$ between them, so the phase shifts for different integer frequency offsets can be calculated. Similarly, symbols spaced two symbols apart have two guard intervals $T_g$ between them, so a different set of phase shifts can be calculated. If the channel is slowly time-varying, this is equivalent to having a guard interval $T_g$ Of twice the original length. Table 1 shows the phase differences between two symbols which are spaced by different amounts.

TABLE 1

Normalized Phase Differences for N = 64, G = 11

Frequency offset in sub-carrier Spacings

| Symbol | −7 | −6 | −5 | −4 | −3 | −2 | −1 | 0 | 1 | 2 | 3 | 4 | 5 | 6 | 7 |
|---|---|---|---|---|---|---|---|---|---|---|---|---|---|---|---|
| 1 | 3 | −2 | −7 | 4 | −1 | −6 | 5 | 0 | −5 | 6 | 1 | −4 | 7 | 2 | −3 |
| 2 | 6 | −4 | 2 | 8 | −2 | 4 | −6 | 0 | 6 | −4 | 2 | 8 | −2 | 4 | −6 |
| 3 | −7 | −6 | −5 | −4 | −3 | −2 | −1 | 0 | 1 | 2 | 3 | 4 | 5 | 6 | 7 |
| 4 | −4 | 8 | 4 | 0 | −4 | 8 | 4 | 0 | −4 | 8 | 4 | 0 | −4 | 8 | 4 |
| 5 | −1 | 6 | −3 | 4 | −5 | 2 | −7 | 0 | 7 | −2 | 5 | −4 | 3 | −6 | 1 |
| 6 | 2 | 4 | 6 | 8 | −6 | −4 | −2 | 0 | 2 | 4 | 6 | 8 | −6 | −4 | −2 |
| 7 | 5 | 2 | −1 | −4 | −7 | 6 | 3 | 0 | −3 | −6 | 7 | 4 | 1 | −2 | −5 |
| 8 | 8 | 0 | 8 | 0 | 8 | 0 | 8 | 0 | 8 | 0 | 8 | 0 | 8 | 0 | 8 |
| 9 | −5 | −2 | 1 | 4 | 7 | −6 | −3 | 0 | 3 | 6 | −7 | −4 | −1 | 2 | 5 |
| 10 | −2 | −4 | −6 | 8 | 6 | 4 | 2 | 0 | −2 | −4 | −6 | 8 | 6 | 4 | 2 |
| 11 | 1 | −6 | 3 | −4 | 5 | −2 | 7 | 0 | −7 | 2 | −5 | 4 | −3 | 6 | −1 |
| 12 | 4 | 8 | −4 | 0 | 4 | 8 | −4 | 0 | 4 | 8 | −4 | 0 | 4 | 8 | −4 |
| 13 | 7 | 6 | 5 | 4 | 3 | 2 | 1 | 0 | −1 | −2 | −3 | −4 | −5 | −6 | −7 |
| 14 | −6 | 4 | −2 | 8 | 2 | −4 | 6 | 0 | −6 | 4 | −2 | 8 | 2 | −4 | 6 |
| 15 | −3 | 2 | 7 | −4 | 1 | 6 | −5 | 0 | 5 | −6 | −1 | 4 | −7 | −2 | 3 |
| Dist | 344 | 352 | 344 | 384 | 344 | 352 | 344 | 0 | 344 | 352 | 344 | 384 | 344 | 352 | 344 |

The phase differences in radians have been multiplied by $8/\pi$ so that all the entries in the table are integers. As an example of how to read the table, for symbols which are 3 symbols apart and with an integral portion of carrier offset equal to 4 sub-channel spacings, the entry at the third row and the column under heading "4" is the normalized value of 4. Multiplying by $\pi/8$ gives a phase rotation of $\pi/2$. By computing the phase differences for several pairs of symbols with different numbers of symbols separating the first and second symbol of each pair and matching these phase differences to the patterns produced by having a particular carrier offset, very accurate estimates of the carrier offset are obtained.

The following calculations are presented to obtain a better appreciation of the performance of the method of the invention. First, let us represent the phase difference when the integer portion of the carrier offset is m and spacing is q by $p_{m,q}$. Then, using 16 consecutive symbols to compute 15 phase differences between pairs of symbols, the carrier offset m can be estimated by finding the minimum over the frequency acquisition rang of m of:

$$\sum_{q=1}^{15} [(\hat{p}_{q,m} - p_{q,m}) \bmod 2\pi]^2.$$

The subtraction is taken modulus $2\pi$, and the result is put into the range from $-\pi$ to $\pi$ since the minimum separation between two phase values is never more than $\pi$. This finds the nearest point representing the integer portion of the carrier offset in N-dimensional space to the actual phase difference observed.

The performance of blind synchronization in an OFDM system using 64 sub-carriers and DQPSK modulation will now be calculated. In a practical system exhibiting a signal-to-noise ratio (SNR) of 15 dB and using only 50 of the 64 sub-carriers to simplify filtering. If the guard interval has 11 samples (G=11) and only two adjacent symbols are used to determine the carrier offset, then the frequency acquisition range is ±7.5 sub-channel spacings. The distribution of the phase differences is approximately Gaussian, and the probability of getting the wrong integer portion of carrier offset is $2Q(\pi/(16\sigma))=5.10 \times 10^{-2}$, where $\sigma$ is the standard deviation of the Gaussian distribution which is 0.1005 for the parameters stated above. Here Q(x) is the commonly used Q function which calculates the area in one tail of the Gaussian distribution.

In a case where the guard interval has 10 samples the frequency acquisition range decreases to ±3.5 sub-channel spacings, but the probability of error is only $2Q(\pi/(8\sigma))=9.47 \times 10^{-5}$. Using a guard interval of 11 samples and 16 symbols to determine the integer portion of the carrier offset the frequency acquisition range is ±7.5 sub-channel spacings and the probability of error is about $14Q(\sqrt{344}\pi/(8\sigma)) \approx 1 \times 10^{-286}$. This last probability of error is very small and indicates that using the method of invention for synchronization purposes can operate very well as long as enough symbols are used for the carrier offset estimates. In general, the design of a system will trade off such factors as the ability to operate at a low SNR, the probability of making an error, the frequency acquisition range, the complexity in getting optimum weighting of phase differences between sub-channels, and the number of symbols used to make the estimates.

It will be clear to one skilled in the art that the above embodiment may be altered in many ways without departing from the scope of the invention. Accordingly, the scope of the invention should be determined by the following claims and their legal equivalents.

What is claimed is:

1. A method of determining an integral portion of a carrier offset $\Delta f_c$ of a signal transmitted at a transmit carrier frequency $f_{ct}$, said signal comprising at least a first data symbol $S_1$ and a second data symbol $S_2$, each of said data symbols having a useful part preceded by a cyclic prefix, said useful part having a symbol interval $T_s$ and said cyclic prefix having a guard interval $T_g$, said method comprising the following steps:

a) receiving said first data symbol $S_1$ and said second data symbol $S_2$ by a receiver at receive carrier frequency $f_{cr}$; and b) determining said integral portion of said carrier offset $\Delta f_c$ between said receive carrier frequency $f_{cr}$ and said transmit carrier frequency $f_{ct}$ in the form of an integral multiple of an inverse $1/T_s$ of said symbol interval;

wherein said carrier offset $\Delta f_c$ comprises said integral portion and a fractional portion such that $\Delta f_c=(z+y)/T_s$, where z is an integer and y is a fraction such that $|y| \leq \frac{1}{2}$.

2. The method of claim 1 wherein said first data symbol $S_1$ and said second data symbol $S_2$ are orthogonal frequency division multiplexed (OFDM) signals constructed from sub-symbols $c_k$ modulated on corresponding sub-carrier frequencies $f_k$ and transmitted in corresponding sub-channels.

3. The method of claim 2 wherein said sub-symbols $c_k$ belong to a $2^m$-ary constellation of complex values equally spaced in phase.

4. The method of claim 3 wherein said $2^m$-ary constellation is selected from the group of phase-shift keyed constellations consisting of BPSK, QPSK, DQPSK, 8-PSK, 8-DPSK, 16-PSK and 16-DPSK.

5. The method of claim 3 wherein said $2^m$-ary constellation is selected from the group of amplitude and phase-shift keyed constellations consisting of 16-APSK, 16-DAPSK, 64-APSK and 64-DAPSK.

6. The method of claim 2 wherein said sub carrier frequencies are spaced by a sub-carrier spacing equal to said inverse $1/T_s$.

7. The method of claim 1 wherein said cyclic prefix comprises a tail portion of said useful part.

8. The method of claim 1 wherein said first data symbol $S_1$ and said second data symbol $S_2$ are received at said receive carrier frequency $f_{cr}$ by taking a number N of, samples during said symbol interval $T_s$ and a number G of samples during said guard interval $T_g$, where N is an integer.

9. The method of claim 8 wherein the length of said guard interval $T_g$ is determined such that G is an integer.

10. The method of claim 9 wherein G is odd.

11. The method of claim 8 wherein said number N is equal to a power of 2.

12. The method of claim 1 wherein said integral portion of said carrier offset $\Delta f_c$ is used for blind synchronization of said receiver.

13. A circuit for determining an integral portion of a carrier offset $\Delta f_c$ of a signal transmitted at a transmit carrier frequency $f_{ct}$, said signal comprising at least a first data symbol $S_1$ and a second data symbol $S_2$, each of said data symbols having a useful part preceded by a cyclic prefix, said useful part having a symbol interval $T_s$ and said cyclic prefix having a guard interval $T_g$, said circuit comprising:

a) a receiving unit for receiving said first data symbol $S_1$ and said second data symbol $S_2$ at a receive carrier frequency $f_{cr}$; and b) a computing unit for determining said integral portion of said carrier offset $\Delta f_c$ between said receive carrier frequency $f_{cr}$ and said transmit carrier frequency $f_{ct}$ in the form of an integral multiple of an inverse $1/T_s$ of said symbol interval;

wherein said carrier offset $\Delta f_c$ comprises said integral portion and a fractional portion such that $\Delta f_c=(z+y)/T_s$, where z is an integer and y is a fraction such that $|y| \leq \frac{1}{2}$.

14. The circuit of claim 13 wherein said first data symbol $S_1$ and said second data symbol $S_2$ are orthogonal frequency division multiplexed (OFDM) signals constructed from sub-symbols $c_k$ modulated on corresponding sub-carrier frequencies $f_k$ and transmitted in corresponding sub-channels, and said receiving unit further comprises a demodulation unit for demodulating said sub-symbols $c_k$.

15. The circuit of claim 14, wherein said sub carrier frequencies are spaced by a sub-carrier spacing equal to said inverse $1/T_s$.

16. The circuit of claim 13 further comprising a synchronizing circuit for using said integral portion of said carrier offset $\Delta f_c$ for blind synchronization of said receiver.

17. The circuit of claim 16 wherein said synchronizing circuit further comprises a sub-circuit for computing a fractional portion of said carrier offset $\Delta f_c$.

* * * * *